Nov. 24, 1942.  A. G. RIEGELSBERGER ET AL  2,302,716

SEED SOWER

Filed Aug. 9, 1938  2 Sheets-Sheet 1

INVENTORS
ANTHONY G. RIEGELSBERGER
BY GILBERT J. FORTHOFER

ATTORNEY.

Nov. 24, 1942.  A. G. RIEGELSBERGER ET AL  2,302,716
SEED SOWER
Filed Aug. 9, 1938  2 Sheets-Sheet 2
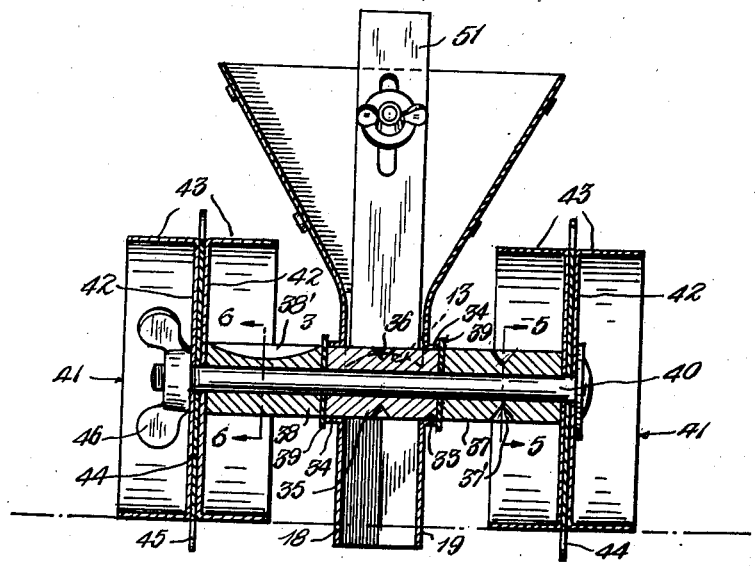
FIG. 3
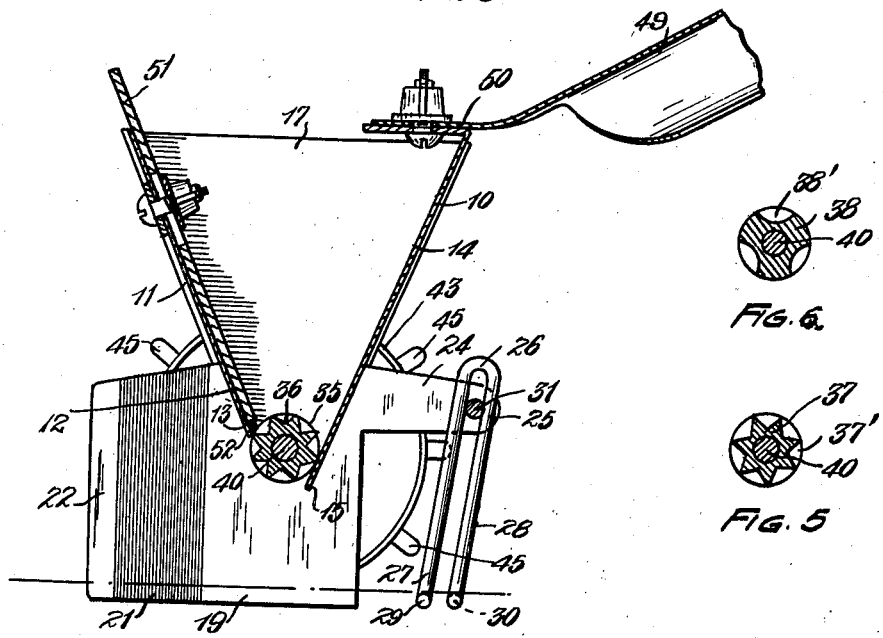
FIG. 4
FIG. 6.
FIG. 5
INVENTORS
ANTHONY G. RIEGELSBERGER
BY GILBERT J. FORTHOFER
ATTORNEY.

Patented Nov. 24, 1942

2,302,716

UNITED STATES PATENT OFFICE 2,302,716

SEED SOWER

Anthony G. Riegelsberger and Gilbert J. Forthofer, Avon, Ohio

Application August 9, 1938, Serial No. 223,896

4 Claims. (Cl. 111—82)

This invention relates to seed sowers of the type employing furrow forming means wherein the seeds may be sowed and thereafter suitably covered with the soil and has for its primary object to provide a seed sower of this type embodying improvements which makes it particularly adaptable to small truck farming or gardening and green house use.

Another object of the present invention is to provide a small and compact hand-pushed seed sower especially useful where space must be conserved and all available ground used for production.

Another object of the present invention is to provide an improved furrow forming means as an integral part of the seed sower and having seed confining portions whereby the discharged seeds are prevented from falling other than into the furrow.

Another object of the present invention is to provide a relatively stationary spreader, normally adjustable, which engages the furrowed soil and causes the latter to be replaced in the furrow over the sowed seeds.

Another object of the present invention is to provide a rotary seed discharging means in the form of interchangeable sleeves constituting a part of the structure so as to be readily available for sowing of seeds of different types and sizes.

Another object of the present invention is to provide a hopper for the seeds provided with a brushing or leveling means for the seeds in the discharging means whereby excess seeds are prevented from being discharged and causing any jamming of parts.

Another object of the present invention is to construct the seed sower of sheet metal stampings which materially lowers its cost and facilitates production.

Another object of the invention is the novel and expedient manner in which the parts are assembled to permit interchangeability and replacement of any part which may be damaged.

With the objects above indicated and other objects hereinafter explained in view, our invention consists in the construction and combination of elements hereinafter described and claimed.

Referring to the drawings,

Figure 3 is a vertical sectional view taken on line 3—3 in Figure 1 and showing structural details thereof.

Figure 4 is a vertical sectional view taken on line 4—4 in Figure 2 and showing further details of the structure.

Figure 5 is a transverse sectional view taken on line 5—5 in Figure 3 and showing the other interchangeable seed discharging sleeve.

Figure 6 is a transverse sectional view taken on line 6—6 in Figure 3 and showing one of the interchangeable seed discharging sleeves.

Figure 2:
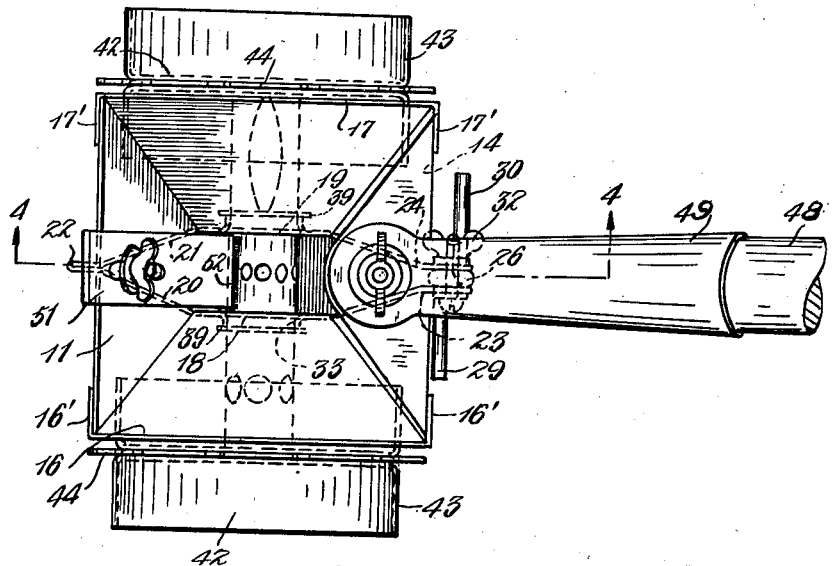
Figure 2 is a top plan view of the seed sower shown in Figure 1.
Figure 1:
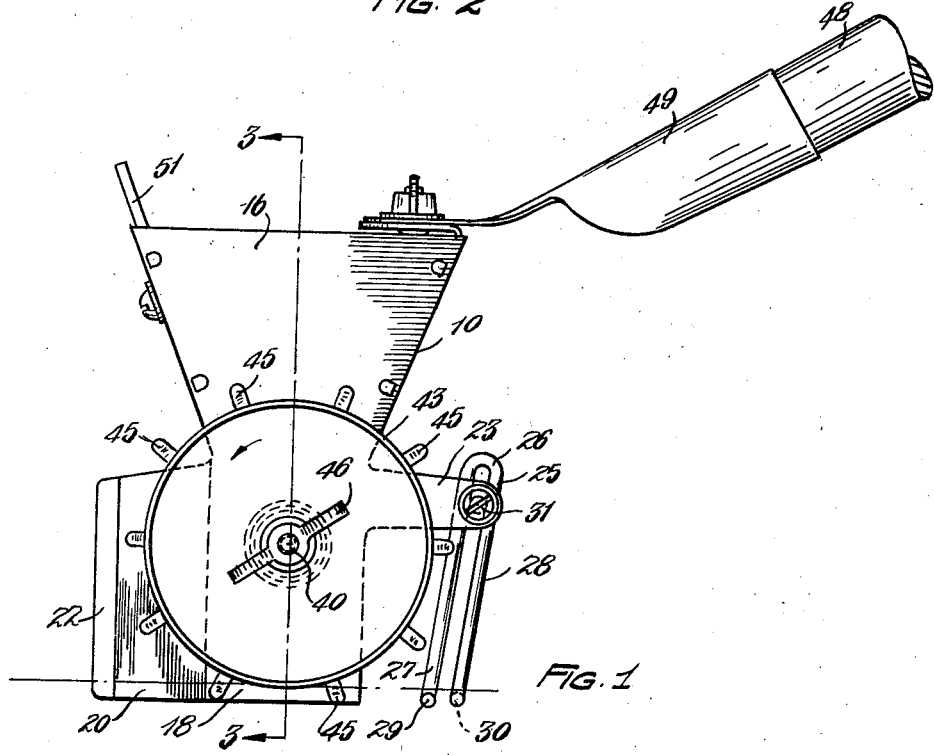
Figure 1 is a side elevational view of the seed sower embodying the present invention, the handle being broken off.

In the drawings, there is illustrated a seed sower embodying the present invention, the structural features of which have proven very effective in actual adaptation but the novel features may be otherwise incorporated and therefore, not restricted in any manner. The seeder includes an inverted substantially pyramidal shaped hopper 10, open at its upper end to receive and temporarily retain the seeds, comprising a flat sheet metal front wall 11 of triangular shape having a rectangular extension 12 at the apex adjacent the bottom, the outer edge of the extension being concave at 13. The rear wall 14 of the hopper is similar to the front wall 11 being formed from flat sheet metal of triangular shape and likewise is provided with a rectangular extension 15 at the apex adjacent the bottom, the extension 15 being spaced from the extension 12 and projecting slightly beyond the latter as more clearly shown in Figure 4. The side walls 16 and 17 of the hopper are likewise, formed from flat sheet metal substantially triangular in shape and are connected at adjacent edges to the front and rear walls, preferably by tongue and slot formations, the side walls having inwardly extending flanges 16' and 17' in abutment with the adjacent surfaces of the front and rear walls. The side walls have parallel spaced depending portions 18 and 19 disposed upon opposite sides of the extensions 13 and 15, which portions project downwardly a desirable distance below the extensions 13 and 15 and constitute a part of the furrow forming means. The depending portions 18 and 19 extend forwardly being bent inwardly at 20 and 21 into engagement with each other at 22 to provide a relatively sharp nose or ground engaging furrow forming end. The depending portions 18 and 19 are also provided with a pair of lateral extensions 23 and 24 respectively, projecting rearwardly at its upper ends at a converging angle, the free ends of the extensions being disposed in parallel spaced relation and having aligned openings therethrough.

A furrow closer or coverer 25 for the furrowed soil is provided and preferably consists of a relatively rigid wire bent to form a loop 26 at its mid portion with its sides 27 and 28 disposed in parallelism and its end portions 29 and 30 bent laterally outwardly in opposite directions for engagement with the furrowed soil. The furrow coverer 25 has its upper end portion slidably mounted in the free ends of the extensions 24 and 25 and may be secured in adjusted position by means of a bolt 31 passing through the aligned openings in the extensions and between the spaced sides of the spreader below the loop 26, a wing nut 32 being provided to secure the members in assembled relation. This arrangement not only permits vertical adjustment but angular adjustment about the bolt axis.

The side portions 18 and 19 are provided with a pair of aligned openings 33 adjacent the extensions 13 and 15 and have outwardly extending annular flanges 34 forming bearings for the opposite ends of the removable rotatable seed discharging sleeves 35 as more clearly shown in Figure 3. The sleeve 35 is provided with a plurality of circumferentially disposed seed receiving recesses 36 of the desired shape and depth and is normally disposed with the extension 15 in close running engagement therewith projecting slightly below the sleeve while the extension 13 also has running engagement diametrically opposite and disposed to permit the seeds to pass beneath the concave end thereof as more clearly shown in Figure 4. Removable sleeves 37 and 38 having circumferentially disposed seed receiving recesses 37' and 38' of the desired shape and depth and of identical size with the sleeve 35, are disposed on opposite sides of the latter in axial alignment, there being spacer members 39 in the form of washers disposed between adjacent ends. The sleeves and washers have axially aligned openings through which a drive shaft 40 extends. A pair of traction wheels 41 are mounted upon the opposite ends of the shaft 40 and inasmuch as they are identical in construction only one will be described in detail. Preferably the wheels are formed from sheet metal stampings comprising a pair of discs 42 forming the web and laterally extending marginal flanges 43 forming the tread surface, a flat plate 44 being disposed between the discs 42 and having circumferentially spaced teeth or lugs 45 projecting outwardly beyond the flanges 43 for penetration into the ground to assist traction. The discs and plate also are provided with aligned axial openings through which the opposite ends of the drive shaft project. In the present instance the drive shaft is in the form of a bolt, the headed end engaging the outside disc on one wheel while a wing nut 46 is threaded onto the other end of the bolt into engagement with the outer disc on the opposite wheel whereby the wheels and sleeves are securely clamped together for unitary rotation. With this construction it will be apparent that a very simple assembly is provided and that the seed discharging sleeves may readily be interchanged by merely removing the drive shaft bolt. It is further noted that the parts are so made as to be interchangeable and replaceable in the event of breakage or wear.

A handle 48 is provided by means of which the sower may be operated. The lower end of the handle fits into a socket 49 having an extension 50 detachably connected to an inwardly projecting flange formed upon the upper end of the rear wall 14 of the hopper. A seed scraper or brusher for preventing the discharge of excess seeds is provided and consists of a flat bar 51 disposed upon the inner face of the front wall 11 and having bristles 52 at its lower end adapted for engagement with the adjacent outer surface of the rotating seed discharging sleeve 35. This scraper is adjustably and removably connected to the front wall 11 by means of a bolt and wing nut connection, a slotted opening being provided in the scraper to permit adjustment.

It will be noted that the furrow forming portion of the seeder extends a little below the traction portion of the wheels where the latter contact the ground so that a furrow of the desired depth is formed and that the side portions 18 and 19 are so disposed with respect to the seed grooves 36 in the sleeve 35 that the discharged seeds cannot fall other than into the furrow.

In operating the seeder, seeds are placed in the hopper and the seeder is pushed by the handle over the ground where the seeds are to be sowed or planted. In the movement of the seeder, the lower portion of the furrow forming nose or end 22 enters the ground forcing the surrounding soil outwardly to provide a furrow in a well known manner. The seed discharging sleeve 35 is rotated during the furrow forming and the seeds in the recesses 36 are carried past the brush and the concave end of the extension 13 and discharged between the side portions 18 and 19 where they fall into the furrow in substantially a continuous line. The furrow coverer 25 is positioned so as to replace the soil in the furrow over the sowed seeds, all of the operations taking place automatically and successively. The compactness of the seeder materially adapts it for use where space is at a premium.

While we have described the preferred embodiment of the invention it is to be understood that we are not to be limited thereto inasmuch as changes and modifications may be resorted to without departing from the spirit of the invention as defined in the appended claims.

What is claimed is:

1. A seed sower comprising: a hopper having a constricted outlet opening at its lower end and depending portions disposed in spaced relation, said portions having transversely aligned openings; furrow forming means ahead of said hopper; a seed discharge member having its opposite ends rotatably mounted in the aligned openings and removable axially therethrough, said discharge member being disposed in the constricted outlet opening in said hopper and provided with circumferential seed receiving recesses; other seed discharging members disposed on opposite sides of said first mentioned discharge member in axial alignment therewith and of identical size relatively to be interchangeable therewith, said last mentioned discharge members having circumferential seed receiving recesses relatively different and different from those on said first mentioned discharge member; spacer members removably disposed between adjacent ends of said discharge members and engageable with the adjacent depending portions for normally preventing removal of said first mentioned discharge member; traction wheels disposed at the outer ends of the outer discharge members; removable means operatively connecting said wheels, discharge members and spacer members, for unitary rotation; and a furrow covering means behind said hopper.

2. A seed sower comprising: a hopper having a constricted outlet opening at its lower end and depending portions disposed in spaced relation, said portions having transversely aligned openings; furrow forming means ahead of said hopper; a seed discharge member having its opposite ends rotatably mounted in the aligned openings and removable axially therethrough, said discharge member being disposed in the constricted outlet opening in said hopper and provided with circumferential seed receiving recesses; other seed discharging members disposed on opposite sides of said first mentioned discharge member in axial alignment therewith and of identical size relatively to be interchangeable therewith, said last mentioned discharge members having circumferential seed receiving recesses relatively different and different from those on said first mentioned discharge member; spacer members removably disposed between adjacent ends of said discharge members and engageable with the adjacent depending portions for normally preventing removal of said first mentioned discharge member; traction wheels disposed at the outer ends of the outer discharge members; a clamping rod removably disposed in axially aligned openings provided in said wheels, discharge members and spacer members, for effecting unitary rotation; and a furrow covering means behind said hopper.

3. A seed sower comprising: a hopper having a constricted outlet opening at its lower end and depending portions disposed in spaced relation, said portions having transversely aligned openings; furrow forming means ahead of said hopper; a seed discharge member having its opposite ends rotatably mounted in the aligned openings and removable axially therethrough, said discharge member being disposed in the constricted outlet opening in said hopper and provided with circumferential seed receiving recesses; other seed discharging members disposed on opposite sides of said first mentioned discharge member in axial alignment therewith and of identical size relatively to be interchangeable therewith, said last mentioned discharge members having circumferential seed receiving recesses relatively different and different from those on said first mentioned discharge member; spacer members removably disposed between adjacent ends of said discharge members and engageable with the adjacent depending portions for normally preventing removal of said first mentioned discharge member; traction wheels, each comprising a pair of closely spaced discs forming a web and laterally extending marginal flanges forming a traction surface, a member disposed between at least one pair of spaced discs and having circumferentially spaced lugs projecting outwardly beyond the traction surface of said flanges, said traction wheels being disposed at the outer ends of the outer discharge members; a bolt removably disposed in axially aligned openings provided in the webs of said wheels, the discharge members and spacer members; means operatively connected to said bolt for maintaining said members mounted thereon in assembled relation to afford unitary rotation; and a furrow covering means behind said hopper.

4. A seed sower comprising: a sheet metal hopper of substantially inverted pyramidal shape having a constricted outlet opening at its apex and including inclined side members having depending side portions extending downwardly a substantial distance on opposite sides of said outlet opening, said side portions projecting forwardly a substantial distance and having their outer ends convergingly connected to provide a vertically disposed furrow forming portion, said side portions at the rear upper portion being provided with integral rearwardly projecting lugs disposed relatively in spaced relation, an inclined front member to which said side members are connected and having its lower end terminating adjacent said outlet opening, an inclined rear member to which said side members are connected and having its lower end terminating adjacent said outlet opening, the upper end of said rear member having a lateral flange to accommodate a handle, said side portions having transversely aligned openings; a seed discharge member having its opposite ends rotatably mounted in the aligned openings and removable axially therethrough, said discharge member being disposed in the constricted outlet opening in said hopper and provided with circumferential seed receiving recesses; means removably mounted at the opposite ends of said discharge member for normally preventing removal of the latter; a traction wheel operatively connected to said discharge member for imparting rotation to the latter, the traction surface of said traction wheel being above the lower edges of the side portions when in engagement with the ground; and a furrow covering means operatively connected to said rearwardly projecting lugs.

ANTHONY G. RIEGELSBERGER.
GILBERT J. FORTHOFER.